United States Patent
Kamaraju

(10) Patent No.: US 12,265,750 B2
(45) Date of Patent: Apr. 1, 2025

(54) AUGMENTED REALITY VIDEO STREAM SYNCHRONIZATION

(71) Applicant: STREEM, LLC, Portland, OR (US)

(72) Inventor: Pavan K. Kamaraju, London (GB)

(73) Assignee: STREEM, LLC, Portland, OR (US)

( * ) Notice: Subject to any disclaimer, the term of this patent is extended or adjusted under 35 U.S.C. 154(b) by 0 days.

(21) Appl. No.: 17/234,987

(22) Filed: Apr. 20, 2021

(65) Prior Publication Data
US 2022/0334789 A1 Oct. 20, 2022

(51) Int. Cl.
*G06F 3/14* (2006.01)
*G06T 11/00* (2006.01)
*G11B 27/036* (2006.01)

(52) U.S. Cl.
CPC ............ *G06F 3/1454* (2013.01); *G06T 11/00* (2013.01); *G11B 27/036* (2013.01)

(58) Field of Classification Search
None
See application file for complete search history.

(56) References Cited

U.S. PATENT DOCUMENTS

| | | | |
|---|---|---|---|
| 10,785,443 B2 | 9/2020 | Fink et al. | |
| 2012/0050524 A1* | 3/2012 | Rinner | G06T 3/40 345/419 |
| 2014/0285519 A1 | 9/2014 | Uusitalo et al. | |
| 2017/0127117 A1 | 5/2017 | Ayers et al. | |
| 2018/0040167 A1 | 2/2018 | Weisman et al. | |
| 2018/0124370 A1 | 5/2018 | Bejot | |
| 2019/0191125 A1 | 6/2019 | Fink et al. | |
| 2019/0318543 A1* | 10/2019 | Skidmore | G06T 15/20 |
| 2020/0204525 A1* | 6/2020 | Shamsaasef | H04N 21/2347 |
| 2020/0312026 A1 | 10/2020 | Spring et al. | |
| 2020/0357165 A1* | 11/2020 | Dixit | G06T 19/006 |
| 2021/0090346 A1 | 3/2021 | Price et al. | |
| 2021/0146240 A1* | 5/2021 | Colenbrander | A63F 13/335 |

OTHER PUBLICATIONS

Korean Intellectual Property Office; International Search Report and Written Opinion; PCT/US2022/024421; Jul. 25, 2022; pp. 1-10.
Korean Intellectual Property Office; International Preliminary Report on Patentability; PCT/US2022/024421; Nov. 2, 2023; pp. 1-7.

* cited by examiner

*Primary Examiner* — Kyle Zhai
(74) *Attorney, Agent, or Firm* — Schwabe Williamson & Wyatt

(57) ABSTRACT

A platform for synchronizing augmented reality (AR) views and information between two or more network connected devices is disclosed. A first device captures a video stream and associated essential meta-data, embeds the essential meta-data into the video stream and transmits it to a second device. The second device receives the video stream, extracts the essential meta-data, inserts one or more AR objects into the video stream with reference to the enhanced meta-data, and transmits to the first device the AR objects and reference to the essential meta-data. The first device renders the one or more AR objects into the video stream, using the essential meta-data references to locate the AR objects in each video stream frame. The second device may also determine and transmit a modified video stream to the first device.

8 Claims, 6 Drawing Sheets

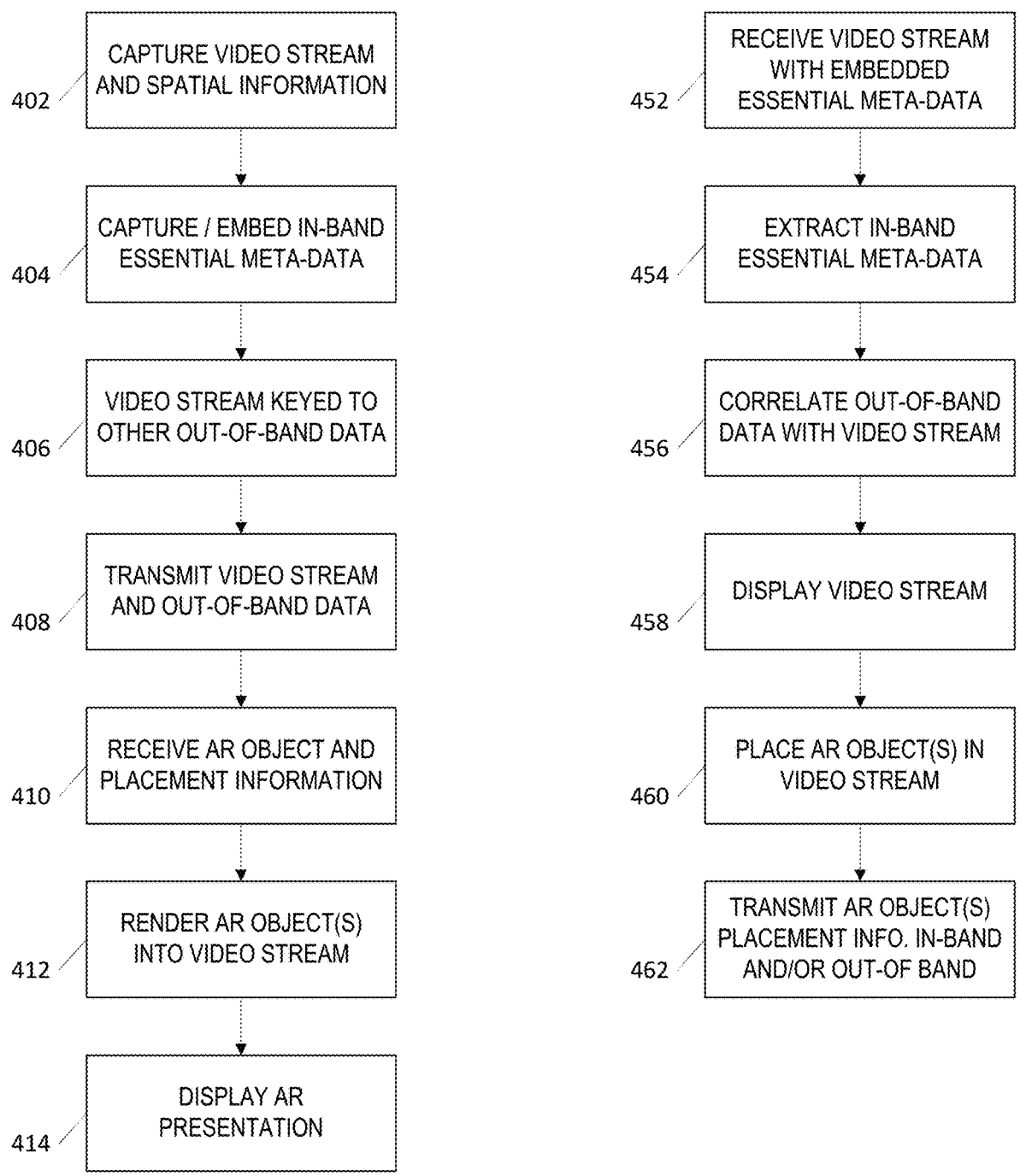
FIG. 4A    400    450    FIG. 4B

AUGMENTED REALITY VIDEO STREAM SYNCHRONIZATION

TECHNICAL FIELD

The present disclosure relates to the field of augmented reality (AR), and specifically to methods and systems for synchronizing an augmented reality video stream across a network.

BACKGROUND

Various devices today, such as smartphones, tablets and smart glasses, are capable of supporting augmented reality (AR). Broadly, AR includes the superimposition of virtual and computer-generated objects over a video stream of a user's surroundings. For example, a person may initiate a video stream of their surroundings on a smartphone or other device, and then use software to add objects to the video stream, making it appear as if the virtual objects were placed within the real world. In various AR implementations, the video stream or feed from a camera, typically the device's on-board camera, may be processed using various algorithms to detect features in the video, such as planes, surfaces, faces, and other recognizable shapes. These detected features may then be used as anchor or reference points for the placement of virtual objects, so that the objects appear stationary with respect to other objects in the scene as the user moves the camera around.

To enhance the AR experience, feature detection may be augmented with motion information captured from motion sensors, such as a MEMS gyroscope and accelerometers, which can instruct AR software as to how the camera is moving, e.g. tilt, pan, rise, fall. This motion information may be combined with detected features and anchor points to provide a more accurate understanding of where the camera is moving in relation to the captured scene, and thus allow virtual objects placed in the video stream to more realistically appear and interact with real objects in the video stream.

BRIEF DESCRIPTION OF THE DRAWINGS

Embodiments will be readily understood by the following detailed description in conjunction with the accompanying drawings. Embodiments are illustrated by way of example and not by way of limitation in the figures of the accompanying drawings.

FIGS. 4A and 4B are flowcharts of methods for AR video stream synchronization that can be executed by a consumer device and a service professional device, respectively, according to various embodiments.

DETAILED DESCRIPTION OF DISCLOSED EMBODIMENTS

Figure 1:
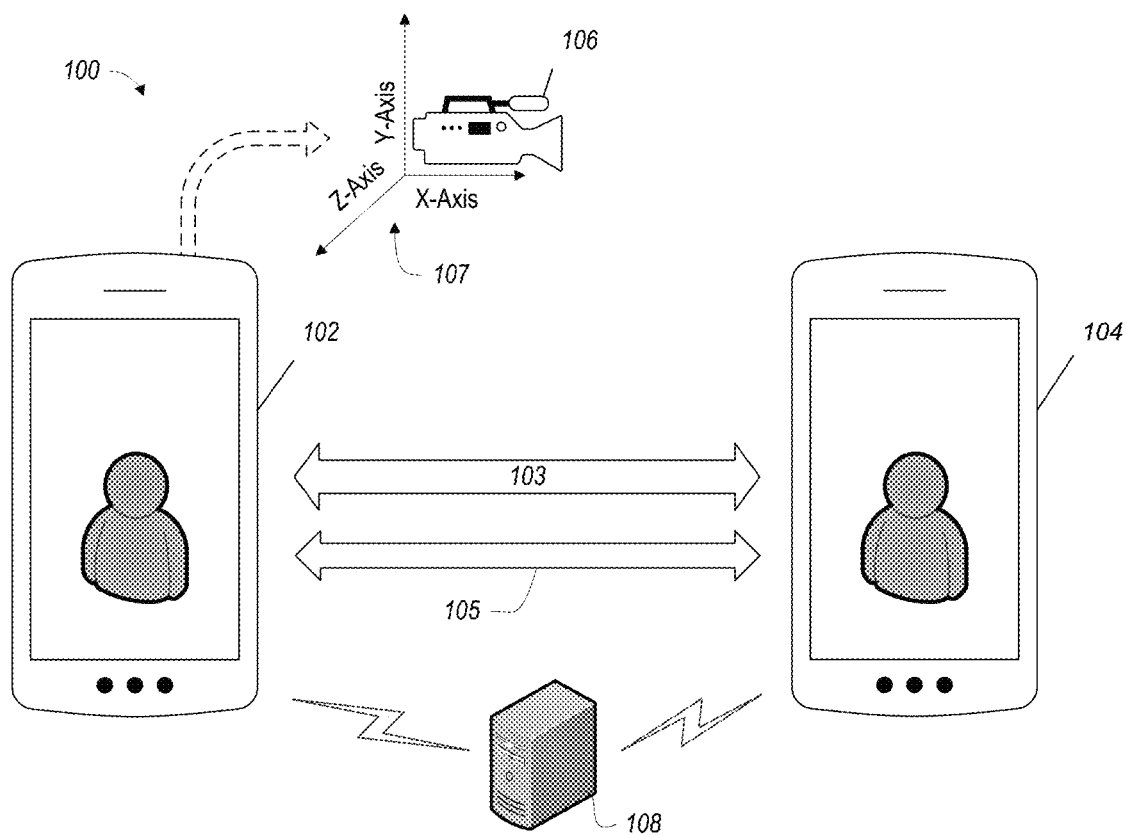
FIG. 1 illustrates a block diagram of the system components of a system implementing AR video stream synchronization across a network, according to various embodiments.

In the following detailed description, reference is made to the accompanying drawings which form a part hereof, and in which are shown by way of illustration embodiments that may be practiced. It is to be understood that other embodiments may be utilized and structural or logical changes may be made without departing from the scope. Therefore, the following detailed description is not to be taken in a limiting sense, and the scope of embodiments is defined by the appended claims and their equivalents.

Various operations may be described as multiple discrete operations in turn, in a manner that may be helpful in understanding embodiments; however, the order of description should not be construed to imply that these operations are order dependent.

The description may use perspective-based descriptions such as up/down, back/front, and top/bottom. Such descriptions are merely used to facilitate the discussion and are not intended to restrict the application of disclosed embodiments.

The terms "coupled" and "connected," along with their derivatives, may be used. It should be understood that these terms are not intended as synonyms for each other. Rather, in particular embodiments, "connected" may be used to indicate that two or more elements are in direct physical contact with each other. "Coupled" may mean that two or more elements are in direct physical contact. However, "coupled" may also mean that two or more elements are not in direct contact with each other, but yet still cooperate or interact with each other.

For the purposes of the description, a phrase in the form "A/B" or in the form "A and/or B" means (A), (B), or (A and B). For the purposes of the description, a phrase in the form "at least one of A, B, and C" means (A), (B), (C), (A and B), (A and C), (B and C), or (A, B and C). For the purposes of the description, a phrase in the form "(A)B" means (B) or (AB) that is, A is an optional element.

The description may use the terms "embodiment" or "embodiments," which may each refer to one or more of the same or different embodiments. Furthermore, the terms "comprising," "including," "having," and the like, as used with respect to embodiments, are synonymous.

AR applications are typically single-device experiences. Sharing an AR experience with a remote device and/or allowing a remote device to superimpose AR objects on a video stream received from a different device poses a challenge, as the lack of spatial information, including motion information and/or depth information, to the remote device may limit the AR software to locally available analysis, such as shape recognition. Thus, the remote device may be enabled to more accurately superimpose AR objects on a video stream from a different device if it can be provided with spatial information or other data that may only be measured by the device capturing the video stream. Further, where the remote device superimposes AR objects, accurately reflecting those objects back to the device originating the video stream requires synchronization of motion and/or detected spatial information and/or other data captured while originating the video stream. The disclosed embodiments provide a solution to allow an AR experience to be shared and synchronized between devices across a network in real time. The shared experience may include unidirectional video stream transfers, e.g., from a consumer device to a service provider device that may return AR data back to the consumer device, bidirectional video stream transfers where the service provider device provides a video stream and AR data back to the consumer device, and/or multi-peer exchanges where various endpoints to a communication session exchange video streams and/or AR data to other peers.

One example of a shared AR experience may include a remote support experience where a consumer device provides a video stream of an environment associated with the consumer device, and a service provider device may augment the video stream with real-time support. The augmentation may include adding AR data, for example, AR synchronization data, to all or a select number of frames in the video stream. The AR synchronization data includes, for example, synchronizing 3D information (e.g., camera pose information and/or other AR metadata) associated with a 2D image, e.g., a frame in a video stream associated with the consumer device. A live video transport mechanism (LVTM) may be used to associate and transfer video stream(s) data and AR data between endpoints, e.g., the consumer device and the service provider device, in a communication session. One exemplary LVTM is WebRTC 1.0: Real-Time Communication Between Browsers, W3C Recommendation 26 Jan. 2021, located at Internet Uniform Resource Locator (URL) www.w3.org/TR/2021/REC-webrtc-20210126. See also, webrtc.org.

Existing solutions provide for out-of-band transmission of essential meta-data, including AR data, that is unique to each frame of a corresponding video stream. In such solutions, the meta-data is transmitted apart from the video stream. However, as the meta-data and video stream may not arrive in sync, e.g. a given frame of the video stream may arrive ahead of or behind its corresponding meta-data, the video stream and meta-data may include an index or similar shared data that allows for subsequent correlation of the meta-data to its corresponding frame(s). Such an approach potentially takes up greater bandwidth from the additional stream of meta-data, hindering usefulness over limited-bandwidth connections. Further, such an approach may be more compute-intensive for the receiving device which has to perform the task of correlating and re-synchronizing the meta-data to its corresponding frame(s) before the video stream can be used for AR interaction.

In embodiments, each or substantially each frame of the video stream from the consumer device may be modified to include in-band transport of essential meta-data, such as some or all of camera position and orientation (pose), camera transform(s), feature points, camera intrinsics (e.g., focal length, image sensor format, and principal point), sequence number, etc., along with video and audio tracks to a remote user. The in-band data may be synchronized with other data sent out-of-band to the video stream, such as AR data generated by the consumer device to send to the service provider, data augmenting the video stream, etc. It will be appreciated that the transport mechanism, e.g., WebRTC or other mechanism, as well as the nature of the connection between the devices may allow out-of-band information to be opportunistically provided in-band. Further, in some embodiments, the out-of-band data may be synchronized with the video stream, while in other embodiments the out-of-band data is sent as an unsynced parallel data stream.

FIG. 1 illustrates an example system 100 that, in embodiments, provides for synchronization of an augmented reality video stream across a network. System 100 includes a consumer device 102 and a service provider device 104, which in turn may be linked via network connections 103 and 105. Consumer device 102 further may include a camera 106 and a spatial position sensor 107. In the depicted embodiment of FIG. 1, consumer device 102 and service provider device 104 are both smartphones, which may be implemented as a computer device 500. Other embodiments may implement either of devices 102 or 104 on a variety of different devices, such as a computer (desktop or laptop), tablet, two-in-one, hybrid, smart glasses, or any other computing device that can accept a camera and provide necessary positional information, as will be discussed in greater detail herein. It will be appreciated that while discussion focuses on exemplary embodiments, either of devices 102 or 104 may be incorporated into, disposed within, or otherwise associated with a "smart" or conventional transportation device, e.g., automobile, bus, taxi, plane, etc., used as part of an entertainment ride/environment, etc.

Network connections 103 and 105 may be carried by any suitable network technology that allows consumer device 102 and service provider device 104 to exchange video and spatial data. Such network connection may be over a local or wide area network, including the Internet, cellular and/or other wired and/or wireless technologies. Network connection 103 may carry a video stream generated by consumer device 102, along with essential meta-data provided in-band with the video stream, and network connection 105 may, if needed, carry other nonessential data and/or additional spatial data associated with the video stream from consumer device 102. From the service provider device 104, data indicating an overlaid AR object may be sent to consumer device 102, and may be carried over either network connection 103 or 105, or possibly a third network connection. It will be appreciated the above examples of in-band essential data is exemplary only. Any data deemed necessary and/or desired to be delivered with the video stream received by the service provider device 104 may be considered essential.

The separation of network connections 103 and 105 may be logical in nature, with both connections being carried over a single physical connection, such as a WiFi, Ethernet, cellular connection, or another suitable network technology. In some embodiments, the logical connection is defined as a separate data payload, so that the video stream and its associated data define network connection 103, and the other non-essential and/or additional data defines network connection 105. It will be understood that where such non-essential and/or additional data is not present, network connection 105 may be unused or not present. In other embodiments, both the video stream and other non-essential and/or additional data may be combined or interleaved into a single logical channel. Network connections 103 and 105, in other embodiments, may be distinguished by different logical ports, such as where the connections employ the transmission control protocol (TCP) or another suitable transport protocol.

Consumer device 102 and service provider device 104 may be in communication with a central server 108. Central server 108 may act as a communications intermediary, handling set up of the initial connection(s) between consumer device 102 and service provider device 104. In some embodiments, network connections 103 and/or 105 are coordinated by and/or pass through central server 108, which may moderate the connections, perform any necessary data processing and/or transformations of connection data, and may store data transferred between consumer device 102 and service provider device 104 for later reference. In other embodiments, central server 108 may coordinate initial setting up of network connections 103 and/or 105, after which consumer device 102 and service provider device 104 continue to communicate directly over network connections 103 and/or 105. Central server 108 may be needed to establish communication if one or more endpoints to a communication session, e.g., consumer device 102, service provider device 104, or other devices participating in the communication session, are behind a firewall, router, Network Address Translation (NAT), or other device interfering with or otherwise preventing a direct peer-to-peer connection between devices in the communication session. Central server 108 may be operated by a third party, and may be accessible over the Internet and/or other network(s), with network connections 103 and/or 105 comprising logical connections or channels that are transported over the Internet. In some embodiments, central server 108 is a cloud service that may be offered by the third party. Central server 108 may be implemented as a stand-alone server, with either a single or multiple physical machines, as or in a data center, via one or more virtual machines or servers, or using any other suitable technique or configuration to provide a network service that is now known or later developed.

Camera 106, in embodiments, is any camera that can provide a suitable video stream for the intended purpose of consumer device 102. Where consumer device 102 is implemented as a smartphone or tablet, camera 106 may be a built-in camera. In other embodiments, such as where consumer device is a laptop, camera 106 may be built in or a separate, external unit. It will be appreciated that while one camera is illustrated there may be multiple cameras to provide multiple perspectives on an environment and that each camera may be used as discussed herein to provide an AR experience. A suitable video stream may be a digital video stream, and may be compressed in embodiments with some form of video compression, such as AVC-HD, H.264, MPEG-4, or another suitable compression scheme. Camera 106 may be configured to output standard or high-definition video, 4K video, 8K video, or another resolution of video suitable for the intended purpose of camera 106 and consumer device 102.

In the disclosed embodiments, spatial position sensor 107 is configured to provide positional information about camera 106, e.g. the camera pose, such as camera 106's pan and tilt. Other measured positional vectors may include camera movements, such as the camera rising or falling, or moving laterally. Spatial position sensor 107 may be implemented with micro or MEMS sensors, such as gyroscopes to measure angular movements and accelerometers to measure linear movements such as rises, falls, and lateral movements. In other embodiments, spatial position sensor 107 may be implemented using any suitable technology capable of measuring spatial movements of camera 106. In one embodiment, the spatial position sensor 107 may be implemented at least in part by a LiDAR sensor, such as one provided, e.g., in Apple Corporation's iPhone 12 Pro or 2020 iPad Pro, to facilitate identifying camera movement, distance measurement, object placement, etc. for the video stream from the camera 106.

In embodiments, spatial position sensor 107 is physically affixed at a suitable location to camera 106, and in such a manner that any movements in space of camera 106 are detected by spatial position sensor 107. In other embodiments, spatial position sensor 107 is combined with camera 106 into consumer device 102, such as where consumer device 102 is a smartphone, tablet, or similar device. It will be understood that, depending upon the distance of the position of position sensor 107 from the center of camera 106's field of view, some amount of transformation of position data from position sensor 107 may be necessary to ensure the position data sufficiently and accurately reflects changes to camera 106's field of view. Spatial position sensor 107, in embodiments, provides spatial data to an AR processing layer in consumer device 102, which correlates the spatial data with the video stream captured by camera 106. It will be appreciated that while a single video stream from one camera 106 is discussed herein, this is only one possible embodiment; in other implementations, there may be multiple video streams from multiple cameras.

Figure 2:
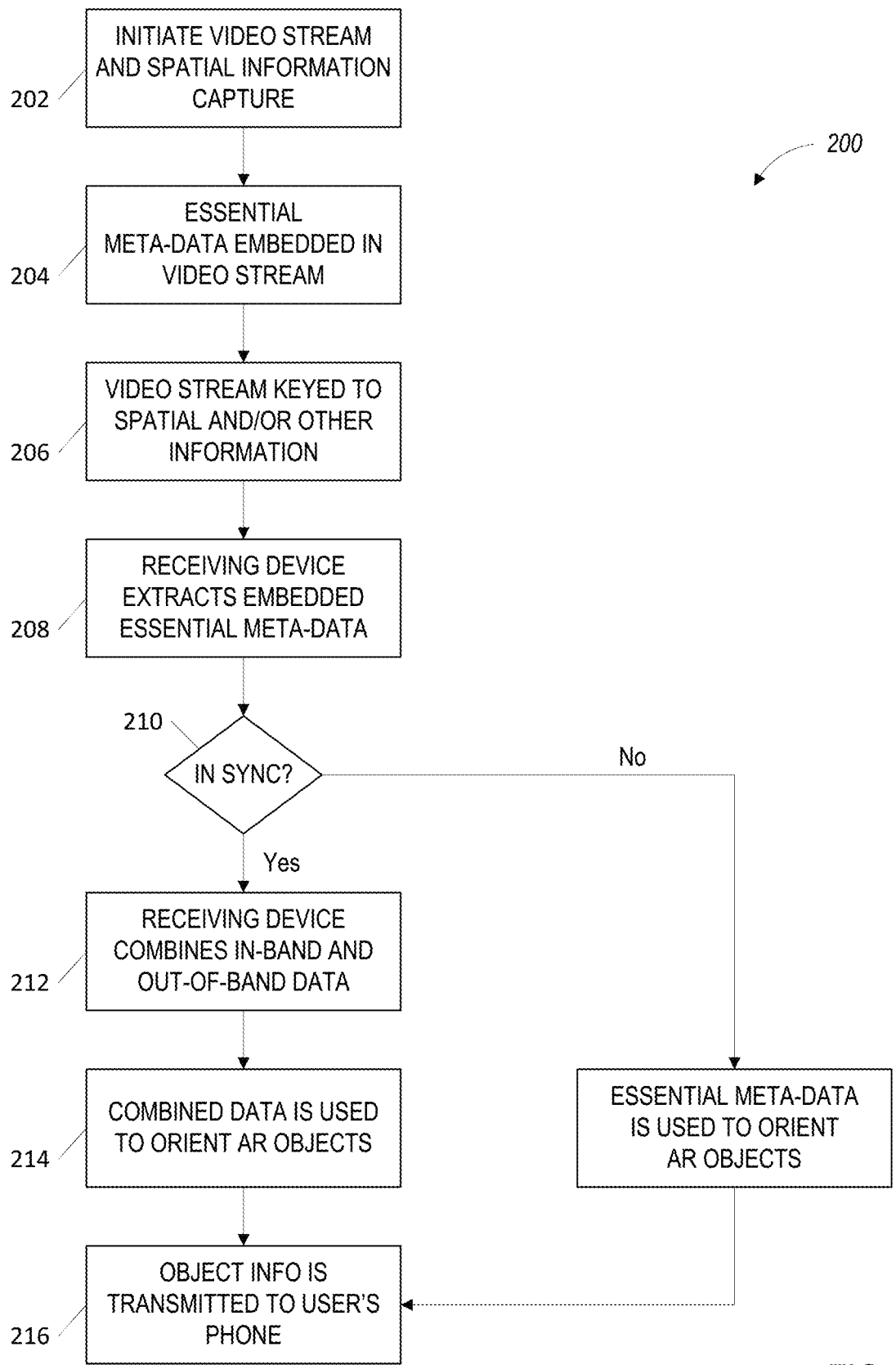
FIG. 2 is a flowchart of a method for AR video stream synchronization across a network that may be implemented by the system of FIG. 1, according to various embodiments.

Turning to FIG. 2, an example method 200 for synchronizing AR data across a network is detailed. In various embodiments the method may be performed, in whole or in part, by one or more components of system 100, including consumer device 102 and service provider device 104. A video stream, e.g. such as from a camera 106 (and/or other camera(s)), is initiated 202, and a stream of corresponding essential meta-data regarding the camera(s) and spatial information is initiated, such as from spatial position sensor 107 and/or other sensors/readouts or other sources of data regarding the state of the camera(s). The video stream may, in examples, be initiated from consumer device 102 and directed to service provider device 104, be initiated by the service provider device, or be requested by the service provider. In some embodiments, geo-fencing or movement/location tracking may be used to control and/or automatically initiate/pause/stop the video stream based on the location and/or movement of the consumer device 102. The video stream may have specifications that vary depending upon the nature and type of device used for capture, such as varying models of consumer device 102 and/or camera 106. Some video streams may be captured in standard definition ("SD", generally around 480 scan lines, e.g. 480p, with a 2D resolution of approximately 720×480), high definition ("HD", 720p or 1080p, corresponding to resolutions of 1280×720 and 1920×1080, respectively), or higher definitions such as 4K or Ultra HD (also known as Quad HD, QHD, or 2160p, corresponding to a resolution of 3840× 2160). Further developments may provide enhanced video resolutions, such as 8K, or even 3D captures in the future.

In some embodiments, the video stream may be initiated by contact with central server 108, such as by consumer device 102. Central server 108 may then allow selection, by consumer device 102, of a service provider and/or other peers/endpoints to participate in a communication session. Following selection, central server 108 may then initiate a communications session between consumer device 102 and a service provider device 104 that is associated with the selected service provider. Central server 108 may hand off the communications session, so that consumer device 102 is in direct, e.g., peer-to-peer, network communication with service provider device 104 (and other peers/endpoint if any), in one possible example, or may act as an intermediary or relay for communications between consumer device 102 and service provider device 104 (and other peers/endpoint if any), in another example. In embodiments where central server 108 acts as an intermediary, central server 108 may be configured to perform any necessary data translation or conversion between consumer device 102 and service provider device 104 (and other peers/endpoint if any), such as where the two devices are mutually incompatible and cannot otherwise be configured to communicate. Still further, where central server 108 acts as an intermediary, central server 108 may enable more than two devices to share a communications session, e.g. one consumer device 102 may provide a video stream and spatial data to multiple service provider devices 104, with central server 108 acting to copy and relay the data between all devices.

The nature of the actual captured video stream may also depend upon the type of network used to connect device 102 with device 104. For example, where devices 102 and 104 are interconnected over a local WiFi hotspot and so share the same network, a high resolution and correspondingly high bandwidth video stream, such as 1080p or 4K, may be employed, as WiFi may offer sufficient bandwidth to handle a 4K stream. Conversely, where devices 102 and 104 are interconnected over a cellular network with only moderate bandwidth, with each device being substantially remote from the other, a lower bandwidth video stream (e.g. standard definition or 720p) may be employed. In any case, the available transmission bandwidth may be used to determine an appropriate video stream resolution so that each device can provide a relatively smooth video and AR experience. Moreover, dynamic adjustment of resolution may be utilized, where the video stream resolution is adjusted periodically or on the fly in response to changing network conditions. Thus, as a network becomes more congested, devices 102 and 104 may negotiate a lower resolution to ensure that an acceptable frame rate and AR experience are provided; conversely, as network bandwidth becomes more available, devices 102 and 104 may negotiate a higher resolution to maximize the visual experience. As a general principle, bandwidth that is sufficient to handle a video stream will be more than adequate to handle AR and position information, as such information tends to require significantly less data.

Each video stream may be comprised of a progressive series of video frames, typically captured at a rate of approximately 30 frames per second (FPS). Other implementations may vary the frame rate. In some implementations, higher frame rates of 60, 90, or greater may be employed. As with video resolution, some embodiments may employ dynamic frame rates, where the rate is changed to arbitrary amounts based upon network conditions, with lower available bandwidth resulting in lower frame rates, and greater available bandwidth resulting in higher frame rates. Essential meta-data for the camera(s), such as camera(s) 106 associated with device 102, is embedded 204 or otherwise incorporated as in-band data in a corresponding video frame so that, for example, the particular view and/or configuration of the camera(s) is stored in the relevant video frame then recorded by the camera(s). By embedding essential meta-data in-band in a video stream, problems inherent to network latency or other data transfer problems that occur when video frame data arrives delayed from the essential meta-data can be avoided, which may occur from network prioritization rules prioritizing video data over other data such as out-of-band (not embedded) data. Such delays can result in rubber banding and/or other video artifacts, if a video stream presentation by the device must update to accommodate late-arriving data, e.g., AR data, received out-of-band from the service provider device, e.g. device 104.

It will be appreciated that different techniques may be employed to encode the essential meta-data, and that the size of data to encode, as well as the encoding technique(s) employed may affect encoding decisions, including whether to employ one or multiple encoding techniques. In one embodiment, data considered essential is embedded into the frames of a video stream to be sent to the service provider device 104. One way to embed the data is to store the data in, for example, a series of floating-point numbers, where the floating-point values are written into video frames. If we assume using 10 floating-point numbers, in a typical hardware architecture, each floating-point number is represented by 32 bits, giving a data field of 320 bits for storing the essential meta-data. The choice of 10 numbers is arbitrary for this example and any number of them may be used so long as it presents a space large enough to store the essential meta-data. Depending on the device displaying the video stream, embedded essential meta-data may be visible or non-visible (hidden) data in the video stream. It will be appreciated that any data may be deemed "essential", and what is considered essential may change depending on circumstance, the specifics of a given embodiment or implementation, or application(s) in use.

Video is typically compressed or encoded following capture, as uncompressed video consumes a significant amount of storage, with storage requirements increasing exponentially as video resolution increases. Efficient video encoding algorithms are lossy, relying upon the fact that a significant portion of the information in a video stream is imperceptible to humans, and that temporally adjacent video frames often have significant portions that are redundant, viz. only a relatively small subset of the pixels actually change between a series of temporally sequential video frames. Consequently, encoded video data, such as a video stream from consumer device 102, typically has data loss resulting from compression, and/or decompression during transmission/receiving. Further, glitches and errors in the transmission medium, e.g. dropped frames or brief connectivity interruptions, may risk loss of some or all of the essential meta-data. To reduce risk of data loss, in some embodiments, essential meta-data may be encoded with data redundancy and/or into the pixels of each video frame in such a configuration that the meta-data can be consistently and reliably recovered from each video frame following encoding and decoding. The technique selected for encoding may vary depending on various factors, such as the capabilities of the devices in a communication session, the transport used for data, the algorithm employed for video encoding (e.g., H.264, H.265, MPEG-2, etc.), the type of data being transferred, etc. Various such encoding techniques are discussed below.

In the illustrated embodiment, assuming transfer of a video stream, each bit of the 320 bits may be represented in a variety of forms, such as just plain bits placed in a video frame, plain bits with parity bits to allow a degree of error recovery, or adding redundant bits to allow comparison to determine what should be the correct bit value. In one embodiment, each bit of the essential meta-data may be represented as a quantized binary bit in a set of 8×4 pixels with max and min values (white, black) indicating 0 or 1. In some such embodiments, each pixel of the block of 8×4 pixels may be of an identical color (such as the aforementioned white or black) to represent the 0 or 1. Each pixel, depending upon the nature of the video, may have multiple values representing three or four channels (RGB, or RGB plus depth or alpha); a white pixel thus could encode as all 1s for each of the multiple values, while a black pixel could encode as all 0s for each of the multiple values. When so encoded, the multiple values effectively can act to provide redundant data, even if several bits across the various channels are improperly transmitted (e.g., switched from 0 to 1 or 1 to 0). Each quantization block can be analyzed to determine whether the encoded bit should be 0 or 1, such as by determining if the predominance of values across each pixel within the quantization block is a 0 or 1. It should be appreciated that, in the foregoing described embodiment, the visible color of each pixel of each quantization block, which may be altered from pure white or black if the pixel values are not accurately transmitted, is immaterial. It will be appreciated that 8×4 sizing is for exemplary purposes and other sizing and encoding shape(s) may be used, depending upon the specifics of a given embodiment. The choice of block size for encoding may further depend upon the video encoding algorithm selected for transporting the video stream, with the block size chosen to ensure that the encoded data is accurately preserved through the encoding and subsequent decoding process. Essential meta-data may be embedded within video frames as discussed below with respect to FIG. 3.

As discussed above, essential meta-data may include, but is not limited to, data such as some or all of camera position and orientation (pose), camera transform(s), feature points, camera, sequence number, etc., along with video and audio tracks to a remote user. Data that is not essential meta-data, may include other captured spatial, environmental, or other information, as well as other data related to the AR environment and/or video presentation (collectively "nonessential data"), may be tied to a corresponding video frame so that, for example, this nonessential data can be later correlated to the camera's motion, a particular view for a given frame, a specific moment in time, etc. In some embodiments, the spatial information stream is captured at a periodic sampling rate that may differ from the video stream frame rate. Each video frame, then, may be keyed 206 to spatial information captured from the spatial information stream during the time duration of the video frame. For example, with a frame rate of 30 FPS, each frame lasts ⅓₀th of a second, and so spatial information captured during the corresponding ⅓₀$^{th}$ of a second of the initial frame capture are keyed, tied, embedded, or otherwise associated with the video frame.

In some embodiments, each video frame may be tagged with the non-essential meta-data or have the non-essential meta-data embedded, in addition to the essential meta-data. In other embodiments, the non-essential meta-data may be stored separately from each video frame, either in a separate data structure, file, or data stream transmitted with each video frame and/or corresponding non-essential meta-data indexed so that subsequently the video stream can be correlated with the correct non-essential meta-data related to the video stream. In embodiments where consumer device 102 is capturing the video, this correlation may be handled by an internal software stack for device 102, such as Apple's ARKit, available in versions of the iOS software. This software may be responsible for keeping video frames synchronized with their corresponding non-essential meta-data. It will be appreciated that Apple Corporation's ARKit is presented for exemplary purposes and other AR environments may be used as disclosed here. For example, Google Corporation's ARCore, PTC Inc.'s Vuforia, and Unity Software's Unity are alternate AR environments that may be used to implement disclosed embodiments.

In some embodiments, essential meta-data and/or non-essential meta-data also includes information derived from the AR layer of the consumer device 102, such as Apple's ARKit, another AR kit, or AR modeling environment. This information may include a point cloud of depth data identified by the AR layer as well as one or more anchor points (which may be part of the point cloud), comprising identified fixed (relative to the camera) points that the AR layer tracks through successive video frames. Examples of anchor points may include identifiable features in a scene such as a doorknob, edge or point of a table, distinct furniture features, objects on a surface, or any other physical object in the video stream that the AR layer can associate with a depth relative to the camera position and that can be tracked across frames as the camera 106 is moved. Some AR implementations can remember the location of anchor points relative to other feature points or depth points in the point cloud even when moved off-frame, allowing an AR object placed relative to the anchor point to move off screen if the camera is panned away, and reappear when the camera is panned back and the anchor point is reacquired. These anchor points and/or point cloud may be transmitted as part of the spatial information.

When transmitting the video stream, depending upon the specifics of a given implementation, a buffer may be employed at various stages in the transmission chain to accommodate the possibility of transient delays or required retransmissions due to transient channel interference. Interference or other communication issues may, as discussed above, lead to corruption of the embedded essential meta-data, which may be recoverable through analysis of the quantized bits. In embodiments where non-essential meta-data is transmitted in a different logical channel 105, viz. a separate data stream, as discussed above with reference to FIG. 1, it is possible frames from the video stream may arrive at a different time from essential meta-data. For example, non-essential meta-data, potentially having a substantially smaller payload compared to the video stream and so requiring less time and bandwidth, may easily be transmitted reliably. Its corresponding video frame, potentially having a relatively greater payload and so requiring greater time and bandwidth for transmission, is potentially more susceptible to delays due to transient channel interference, and may arrive delayed from the non-essential meta-data. As will be understood, such a delay may not be an issue or may not be present where the non-essential meta-data is embedded in-band or otherwise transmitted as part of the video stream, e.g., transmitted along with embedding essential meta-data.

For transmission over the network to device 104, and particularly in some embodiments where non-essential meta-data or other data is transmitted in a separate stream from video, each frame of the video stream may be keyed, e.g., tagged with a key, as illustrated in box 206 to correlate to a particular portion of the non-essential meta-data stream and/or other data stream that corresponds to the camera's movement at the time of frame capture. The non-essential meta-data and/or other out-of-band data stream may likewise be tagged with the same key as its corresponding video frame. This tagged enables each frame of the video stream to be reassociated, such as by service provider device 104, with its corresponding non-essential meta-data and/or other out-of-band data stream in the event that the video stream and non-essential meta-data arrive at different times (e.g. out of sync). In some embodiments, this key may comprise a rolling frame number that may index into the non-essential meta-data stream, e.g. once the number reaches its limit, it rolls around to zero and restarts its count.

The size of the key (e.g. available numbers) may impact upon the amount of video that can be buffered and the degree to which the video stream and non-essential meta-data can be transmitted out of sync. In one particular embodiment, the tagged key may comprise an 8-bit number (ranging from 0-255). Each frame may be numbered sequentially starting at 0 and counting to 255, at which point the next frame restarts at number 0. It will be appreciated that 8 bits is an arbitrary choice and more, or fewer, bits may be used. Where video is transmitted at a rate of 30 frames per second (fps), an eight-bit key allows for approximately eight (8) seconds of video frames, which corresponds to roughly 240 frames, to be transmitted out of sync before frames and/or non-essential meta-data and/or other data must be skipped or dropped, resulting in an interrupt or hiccup in AR synchronization and/or the video stream. It will be appreciated that resyncing may cause artifacts in AR presentations when object data (e.g., AR object(s) position(s), movement(s), etc.) are out of sync to a video stream and its embedded essential data. In the past, if the video stream is received ahead of a data stream containing information required to present AR content, video frames would be dropped until the video stream and out-of-band data stream were in sync (see, e.g., keying 206). Now the AR presentation can continue, if needed, based on known object information and the essential data, and the presentation may be updated as needed when non-essential data is received.

In the illustrated embodiment, essential meta-data, as discussed above, may include data such as some or all of camera position and orientation (pose) data, camera transform(s), feature points, camera intrinsics (e.g., focal length, image sensor format, and principal point), sequence number, etc. By embedding 204 the essential meta-data in-band with a video stream as illustrated, visual disturbances may be minimized since embedded essential meta-data may be applied to known AR data/models, and, if necessary, used to continue a user experience while a resync occurs between, for example, a video steam and other keyed spatial information and/or other associated data streams associated with a video stream. In one embodiment, all data necessary for the AR presentation of the video stream is embedded in-band, e.g., as non-visible steganographic data, and loss of sync with other data streams does not impact AR presentation of existing AR objects. That is, new AR objects may be presented in a delayed data stream while existing objects may continue to be presented based on embedded essential meta-data. In one embodiment, if essential meta-data identifies an AR object that has not yet been defined by out-of-band data, e.g., the out-of-band data stream is delayed, but is flagged as important/necessary to be displayed, rather than dropping frames to await the delayed data stream, instead a placeholder object known to be cached by, for example, user device 102, may be used to give a primitive representation of the necessary object. The essential meta-data may include data necessary to render the primitive object.

It will be appreciated that the size/range of the key used to key 206 non-essential data and/or other data may be varied depending upon the condition of the network, video frame size (e.g. SD, HD, UHD), video frame rate (24 fps, 30 fps, 60 fps, etc.), and available buffer size. For example, higher frame rates transmitted over a given network speed and bandwidth may necessitate a larger buffer. For a given video resolution, a 60 fps video stream will only allow for four (4) seconds of un-synched video frames with an 8-bit key compared to the same video resolution at 30 fps. A 16-bit key, by comparison, would allow for over 64,000 unique keys, which amounts to over half an hour (>36 minutes) of video frames at 30 fps, and over 18 minutes at 60 fps (>18 minutes). However, available buffer space and/or storage subsystem bandwidth (such as in implementations where buffer space requires writing to storage) may impose a shorter limit, despite sufficient key space. A key that is shorter than 8 bits will allow fewer frames to be buffered, as will be understood. As noted above, the key sizes described above are merely examples; any suitable key length may be employed, depending upon the needs of a given implementation, and may be selected in consideration of other aspects discussed above, e.g. video resolution, available network and/or storage subsystem bandwidth, available buffer resources, etc.

Other embodiments may not use a numerical key, but instead could use some generated code or tag that is unique to each frame, such as a hash generated from each frame, possibly by using a hash function such as MD5. Where a function is used to generate a unique non-repeating key for each frame, synchronization may be possible over extended periods of delays, to the point where other factors become limiting, such as buffer size limits or the ability to easily resync AR objects created on, for example, device 104 to device 102, and practical limits, such as user patience with a substantially delayed stream.

Following keying 206, the combined video and embedded essential meta-data stream, and the separate non-essential meta-data stream (if present and if not embedded along with the essential meta-data), may be transmitted over network connections 103 and 105, respectively, to device 104. A receiving device, such as service provider device 104, may extract 208 the embedded essential meta-data. As discussed above, the essential meta-data, provided in-band with the video stream, allows a receiving device to have at least minimal data necessary to provide an AR experience if there is a delay in receiving out-of-band data corresponding to the in-band data embedded in a video stream. After receiving a video frame or frames providing essential meta-data, a test may be performed to determine if 210 the video stream is in sync with out-of-band data (if any) relating to the video stream and AR experience. If so, then non-essential meta-data and/or other data is then extracted from the out-of-band data and combined 212 with its corresponding in-band data for the video frame, such as, in various embodiments, by using the tagged key discussed above, thus effectively reconstructing the information supplied by the transmitting device in the in-band and out-of-band data; for example, reconstructing the information that the hardware or software (such as ARKit) on device 102 would supply.

Once the video, essential meta-data and/or other data are combined with an associated video frame, the receiving device, such as device 104, may use 214 the combined in-band and out-of-band data, possibly in conjunction with image analysis of each frame to identify reference objects, as discussed above, to render and place virtual objects within the video stream. The captured essential meta-data may allow software on the receiving device, such as Apple's SceneKit or another suitable graphics API, to position a virtual camera and render an object accurately within the video stream. In some embodiments, the receiving device may perform image analysis on the received frame to determine reference objects, which may be combined with transmitted essential meta-data. In other embodiments, the transmitting device, such as device 102, may perform the image analysis and transmit information identifying the reference objects along with other essential meta-data to the receiving device.

Finally, in block 216, the rendered object and other AR information may be transmitted, such as from device 104 back to device 102, where the receiving device can use the rendered object information along with its video and essential meta-data to recreate the AR scene as generated by the initial receiver of the video stream, e.g. service provider device 104. A user the initial transmitting device, e.g. consumer device 102, may thereby be enabled to share a view of their surroundings with a user of the receiving device, e.g. service provider device 104, who can then superimpose objects and share the superimposed objects with the user of the initial transmitting device.

It will be appreciated that the test to determine if the in-band and out-of-band data are in sync may indicate a transmission lag or other issue has caused one or more frame of a video stream to arrive too early or too late for combining 212 in-band data with corresponding out-of-band data. If 210 the out-of-band data is out of sync, then as discussed above, the essential meta-data sent in-band with the video stream may be used to orient AR objects as discussed above with respect to item 214. While the information for AR presentation is not complete, with at least information relating to use of a camera, see, e.g., FIG. 1 item 106, it is possible to reconstruct an appropriate view on an AR model with just the essential meta-data.

Similar to the initially transmitted video and/or essential meta-data, the AR information may be transmitted from device 104 over one or more of the network channels 103 or 105, or possibly over a third network channel, depending upon the needs of a given implementation. The transmitted AR information may comprise quantity, location, size, and shape of various placed AR objects, and/or any other information specific to a given AR implementation. For example, devices that implement ARKit and/or SceneKit for graphics rendering may define or otherwise require specific types and/or structures of data to define and position an AR object; other available interfaces may specify different data types and/or structures. This information may be tagged with the same key number used to tag the video frame and non-essential meta-data transmitted from device 102 to 104, which then may be used by device 102 to correlate the AR information with its associated frame and non-essential meta-data for local rendering of the AR objects.

Some embodiments may employ a pre-processing stage on the initial transmitting device, e.g. consumer device 102, that performs synchronization of the received AR information with the video stream, along with any other necessary processing, prior to providing the AR information to the AR and graphics rendering subsystems. Such a pre-processing layer can, in some implementations, enable cross-platform communications, e.g. where consumer device 102 runs Apple iOS, and the service provider device 104 runs Google Android. In such an embodiment, Android may use a different data form for AR objects that would need to be translated for Apple's ARKit. Other embodiments may employ an abstraction layer on both consumer device 102 and on service provider device 104, where data is transmitted in a relatively generic or industry-standard format, and the abstraction layer handles any necessary translation to each respective device's particular AR and graphics interfaces. In still other embodiments, a central server 108 may handle any necessary translation, with each respective device connecting to central server 108 identifying its type (iOS, Android, Windows) and/or specific interface requirements.

Figure 3A:
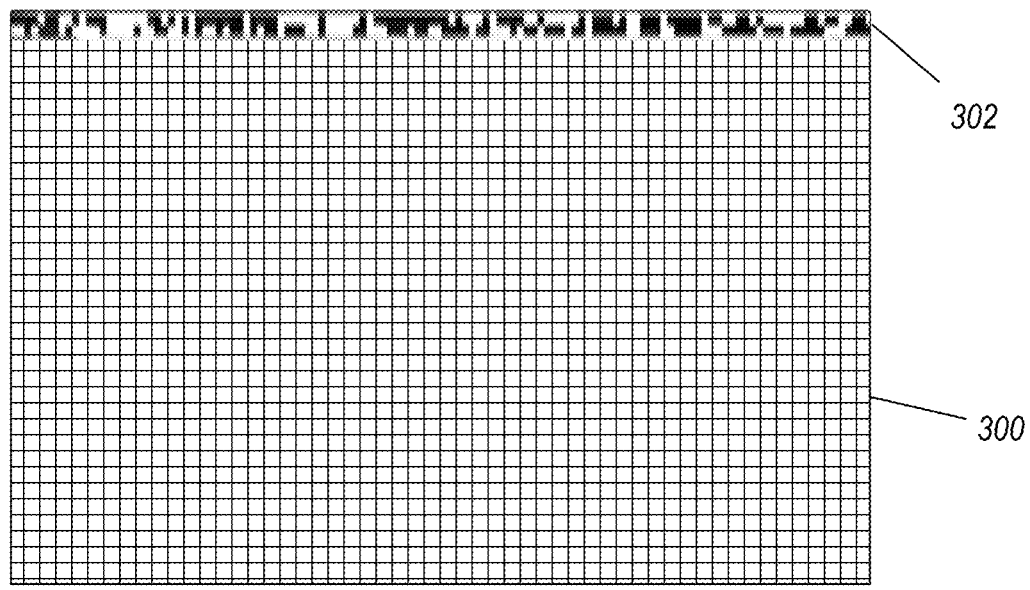
FIGS. 3A and 3B depict possible video frame layouts for including synchronization data, according to various embodiments.
Figure 3B:
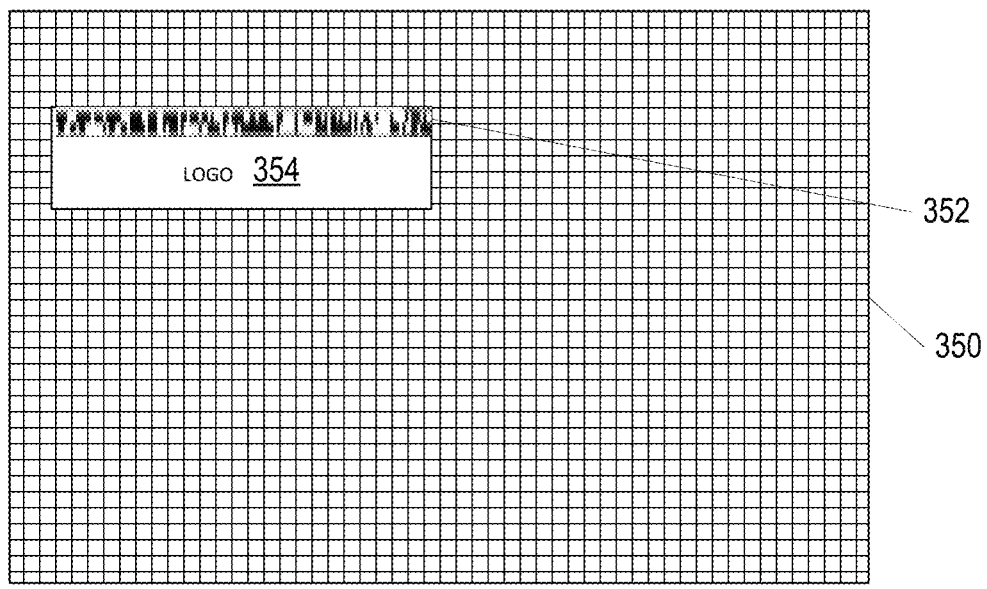

FIGS. 3A and 3B depict, as discussed above, two different arrangements by which essential meta-data may be embedded in a video frame 300, 350. The meta-data may include or otherwise be associated with a key (not illustrated; see FIG. 2 item 206) used to cross-reference out-of-band data to a video frame for transmission and correlating associated non-essential meta-data and/or other data, as discussed above. FIG. 3A depicts a video frame 300, which is shown as a grid to indicate the various video pixels in its 2-D arrangement, as may be seen on a screen. Quantized essential meta-data 302 is shown in the upper left corner and extending across the top of the video frame. It will be appreciated that the length and height of the row will change depending on the quantization used, e.g. size of pixel block, and the size of the frame. The meta-data 302 is illustrated as going across the entire frame for visual convenience. Similarly, FIG. 3B depicts a video frame 350, with quantized essential meta-data 352 shown tagged to the first series of pixels in the top-most row of a logo 354.

As will be appreciated, embedding essential meta-data 302, 352 in-band with a video frame 300, 250 will enable rendering frames in an AR or VR presentation with a minimization of problems if related out-of-band data is not received/available when a frame is being processed. As discussed above, known objects in, for example, an AR presentation may continue to be displayed/output using the essential meta-data, since movement of the camera, other camera-related intrinsics and/or other data marked essential, is present in the video frame. This allows avoiding dropping frames until associated out-of-band data is received. It will be appreciated that a key (see, e.g., FIG. 2 item 206) or other marker synchronizing video frames and/or non-essential meta-data and/or out-of-band data may be used to determine if and when either a video frame or portion of out-of-band data needs to be dropped. If video frames are not dropped, it may be that out-of-band data is late-received for video frames that have already been presented. In this case, where appropriate, the out-of-band data may contain information that may be used to update the presentation. However, it will be appreciated the out-of-band data may be stale and hence portions of out-of-band data may be discarded until a key or other synchronization technique indicates synchronization has been obtained between a video presentation and the out-of-band data that is available. Video frames with in-band essential meta-data, and received out-of-band data, may be buffered. This facilitates syncing, e.g., by using embedded keys or other identifiers, video frames with related out-of-band data.

In the illustrated embodiment, WebRTC is used to deliver data (e.g., video, audio, other data, etc.) for an Augmented Reality (AR) experience. As will be understood by one skilled in the art, WebRTC provides a framework for real-time communication that may be run within a web browser or integrated into an application program installed into a machine or computing device, such as a server, personal computer, portable phone, etc. WebRTC provides a framework for engaging in communication along with data sharing, such as over data channels established between the endpoints (peers) of a communication session. WebRTC may therefore be used to establish and provide an AR-based video conference call between two peers, e.g., a customer and a technical support agent, as well as to provide data channels for transferring data between peers. As discussed above, a desired number (all, or a selected subset) of frames in a video stream may be encoded with essential meta-data 302, 352, and be cross-referenced to synchronize with out-of-band data associated with the video stream.

In some embodiments, synchronization between a video stream with in-band data and out-of-band data may be facilitated with used of WebRTC Insertable Streams (WIS), or the like. WIS may be used to provide for, among other things, a collection of streams that may be used to supplement WebRTC communication, in which, for example, a video stream with AR presentation is provided in one or more stream, and associated out-of-band data is provided in another one or more stream. A feature of WIS, or similar technology, is sequencing of stream data is built in to provide in-order data delivery and therefore minimizes the likelihood of a video stream and in-band data arriving earlier to and out of sync with associated out-of-band data, or conversely. However, in-order data delivery does not avoid other networking or technical problems interfering with sending the out-of-band data. Thus, if there is no issue with sending the out-of-band data, a video stream will have all data, in-band and out-of-band, necessary to render a complete AR presentation. But, if there is a problem with sending out-of-band data, received video frames may be used as discussed above to present an AR presentation with just the in-band data, though possibly with quality degradation until out-of-band data is received. In some embodiments, an expert system, Artificial Intelligence, or other smart processing/analysis may be used to analyze what data has been received, and predict a best combination of video stream frame dropping and waiting for out-of-band data to provide the best AR experience.

The figures are not to scale, as each pixel itself may comprise any number of bits depending on hardware/software implementation, e.g., 24 or 32 bits (8 bits each for red, green, blue, and possibly an alpha channel). Where the essential meta-data 302 requires fewer bits to encode it than is used to represent a number of pixels able to store the essential meta-data, the unused pixel bits may be padded with a predefined value, which may be zero or, as discussed above with respect to FIG. 2, the unused pixel bits may be duplicated with the encoded values for redundancy. In one embodiment, the essential meta-data may be provided over one or more channels in one or more pixels. Placement of the essential meta-data within an edge row or column may allow the pixel or pixels (or one or more channels within one or more pixels) to effectively be hidden on most screens, particularly if overscan is present. In other embodiments, to avoid introducing screen artifacts, the essential meta-data may be embedded as discussed above within a logo or other portion of a video frame such that it would be difficult to see, particularly on displays with relative high pixel pitches (e.g. greater than 200 pixels per inch, such as on Apple's Retina® display). Alternatively, in some embodiments, steganography or equivalent data-hiding approach may be used to embed the essential meta-data within a video frame 300, 350, effectively rendering it unnoticeable.

It will be appreciated that the placement of the essential meta-data 302, 352 is exemplary and may be adjusted, for example, to better accommodate steganography hiding principles. For example, essential meta-data may be spread throughout a video frame, e.g., by altering one or more pixel at pre-determined locations in the video frame 300, 350 so as to provide an unnoticeable encoding of the data within the frame. And as discussed above, WebRTC, WebRTC Insertable Streams, or other delivery mechanism for a video stream and/or AR presentation may provide separate data channels for a video frame to allow non-visibly attaching data, e.g., essential or non-essential meta-data, as associated frame meta-data, alleviating in the case of essential meta-data, the need to hide the essential meta-data. Depending on the transmission environment, each bit of the essential meta-data may be redundantly encoded into a frame, if needed, to ensure recovery of the enhanced meta-data.

As discussed above with respect to FIG. 2, it should be observed that some video formats employ various compression schemes to reduce the bandwidth requirements for a given video resolution and frame rate. Some compression schemes that may be employed are lossy in nature, such as MPEG or AVC-HD encoding, which may, in some embodiments, only occasionally transmit complete frames. Intermediate frames are reduced to information about changes between frames, leaving the video decompressor and decoder responsible for video playback to recreate each actual frame. Many such schemes employ techniques to ensure that only redundant information is discarded, and so the embedded essential meta-data may be unaffected. Nevertheless, placement of essential meta-data may require consideration of the compression scheme to be used to ensure it is passed through accurately, and not discarded in the compression process, including adding redundancy or use of data streams or other transport that may be synchronized to the video stream. Where the employed compression poses a risk of essential meta-data corruption or loss, the quantization of the essential-meta-data bits may allow reconstruction of damaged data. In some embodiments, embedding the essential meta-data in a frame is delayed until after compression, and then extracted by a receiver prior to decompression.

Although embedding essential meta-data has been described in the foregoing discussion as useful for ensuring embedded essential meta-data is available with each video frame without need for correlation, the essential meta-data may also be used to uniquely identify each frame, which may be subsequently used for syncing any other AR objects or other data placed by a user of service provider device 104 with the video stream from consumer device 102 that was not already identified within the embedded essential meta-data. This relationship will be described in greater detail with reference to FIGS. 4A and 4B. Thus, in embodiments where essential meta-data is embedded within corresponding video stream frame(s), each frame may be uniquely identified for purposes of placing an AR object into the video stream, if the particular AR implementation so requires. In one embodiment, to provide unique frame identification, a unique (or relatively unique, e.g., providing for roll-over) key or tag may be incorporated into the essential meta-data, or embedded with it in corresponding video frame(s).

FIGS. 4A and 4B are flowcharts of two example methods 400 and 450 for handling placement of AR objects across a network. Methods 400 and 450 may be performed, in whole or in part, by consumer device 102 and service provider device 104, respectively. Various operations in each example method are duplicative of or similar to the operations described above with respect to method 200. The reader is directed to the foregoing discussion of method 200 for greater detail. As used in the following discussion of FIGS. 4A and 4B, "transmitting device" refers to the device that is transmitting the video stream and associated spatial position information and/or other data. In embodiments, this is typically the consumer device 102. Likewise, "receiving device" refers to the device that is receiving the video stream and associated spatial position information and/or other data, is placing AR objects, and transmitting those AR objects back to the transmitting device. In embodiments, this is typically the service provider device 104. The service provider device may be any number of possible peers or endpoints to a communication session, including a technical support agent (live as well as AI), a video conferencing party, a gaming environment (e.g., an environment may immerse, for example, consumer surroundings in a game by placing AR objects into your video stream), etc.

In operation 402 of method 400, a video stream and associated essential meta-data are captured, such as by a consumer device 102, and embedded 404 into a video frame (or frames) as discussed above. In some embodiments, this capture from a video camera 106 and spatial position sensor 107 may be coordinated by an AR layer in consumer device 102, which is responsible for generating and/or coordinating any necessary AR data to support placement of AR objects, such as extracting or extrapolating depth data, generating a point cloud, designating anchor points, etc. It will be appreciated that consumer device 102 may incorporate or be associated with or otherwise communicatively coupled to hardware, such as a LiDAR sensor (which may be part of position sensor 107), that generates data that may be embedded (directly and/or indirectly) into a video frame as part of essential meta-data to be transmitted along with the frame. In some implementations where the capturing device lacks a spatial position sensor, an AR layer may extrapolate camera movements and depth data by analysis of the video stream, such as by using photogrammetry techniques. In operation 406, the various frames of the video stream are keyed/tagged or otherwise (e.g., by way of synchronized data streams) synchronized with additional spatial information, AR and/or VR model information, or other data to be sent along with the video as out-of-band data.

In operation 408, the video stream and out-of-band data, e.g., additional spatial information, AR or VR model information, or other data (it will be appreciated that any arbitrary data may be presented as out-of-band data), are transmitted to a receiving device, such as service provider device 104. In some embodiments, the video stream is keyed to the out-of-band data, and each is then transmitted using a separate logical (if not physical) channel, such as using WebRTC Insertable Streams or the like. In embodiments where the video stream with embedded essential meta-data is transmitted in one channel, out-of-band data may be transmitted in another channel and combined with the video stream in any suitable fashion. For example, out-of-band data may be interleaved, overlaid, embedded, or otherwise incorporated into the video stream data.

In some such embodiments, synchronization is unnecessary, as each video frame carries its own embedded essential meta-data. If there is no need for out-of-band data, there is no need to be able to later correlate data with the video stream. In other embodiments, out-of-band data may be interleaved between frame data, if bandwidth permits. A key, tag, coordinated data streams (e.g., WebRTC Insertable Streams) or other synchronization may or may not be required in such configurations, depending on how the out-of-band data is incorporated into the video stream. For example, WebRTC Insertable Streams will automatically synchronize a video stream and associated out-of-band data. As will be understood, the video stream and out-of-band data may be transmitted directly to a receiving device or, in other embodiments, may be transmitted to a central server 108, for subsequent retransmission to one or more receiving devices. Central server 108 may also perform and manipulations or transformations on the video stream and out-of-band data that may be necessary.

Following transmission 408 of the video stream and out-of-band data (if any), in operation 410, one or more AR objects and associated placement information (AR data) may be received by the transmitting device, e.g. consumer device 102, from the receiving device, e.g. service provider device 104, either directly or by way of a central server 108. As discussed above for sending a video stream to a service provider device 104, camera intrinsics and/or other data from a consumer device 102 may be transmitted to the service provider device as in-band data. It will be appreciated that, if the service provider device (or other communication endpoint in a communication session) is providing video back to the consumer device 102, AR data from the service provider device 104 may be embedded into the video stream and transmitted as in-band data transmitted to the consumer device 102. In embodiments, the AR data may include a description of the particular AR object or objects, as well as data indicating where, in space and/or each video frame, the AR object or objects are to be located when rendered. In other embodiments, the AR data may be limited to a reference to an AR object or objects, in addition to location data. In such embodiments, both the transmitting and receiving devices, e.g. consumer device 102 and service provider device 104, may include a common library of AR objects that defines the characteristics of each object. The AR data would only need to reference a particular object in the library, which the transmitting and receiving devices could then retrieve for placement and rendering. In still other embodiments, such as where a central server 108 acts as an intermediary between the transmitting and receiving devices, central server 108 may provide AR object information that the transmitting and receiving devices can commonly reference.

Once the transmitting device, e.g. consumer device 102, receives the AR data from the receiving device, e.g. service provider device 104, in operation 412 the transmitting device may then render the AR objects received from the receiving device, e.g., by extracting information from data received in-band and or out-of-band and/or in separate data streams, into the video stream that was previously transmitted, in operation 412. In operation 414, the transmitting device may then, in some embodiments, display the video stream and AR objects on a display associated with (e.g., part of and/or communicatively coupled with) the transmitting device. Thus, a user of the transmitting device can view the scene captured by the transmitting device's camera and remotely placed AR objects from the receiving device in real-time.

In some embodiments, the AR data may simply be a reference or AR object description coupled with information that ties the AR object to one or more anchor points identified in the video stream. The anchor points are transmitted from the transmitting device to the receiving device as part of the essential meta-data incorporating spatial information. Thus, an object may be placed by a user with the receiving device, e.g. service provider device 104, received by the transmitting device, e.g. consumer device 102, and be persistently present in the video stream as viewed by a user of the transmitting device, based on anchor points identified by the AR subsystem (e.g. ARKit), as though the AR object were physically present in the scene captured by the transmitting device. In some such embodiments, the AR subsystem may handle managing anchor points, and likewise coordinate where the AR object(s) should be rendered in each video frame, as the transmitting device moves. In other embodiments, software specific to apparatus 100, such as client software for interfacing with a central server 108, handles coordinating received AR objects with anchor points in the video stream.

In some embodiments, as a precursor to rendering, the transmitting device may first need to correlate the AR data stream from the receiving device to the video stream. For example, where a user of receiving device, e.g. service provide device 104, is manipulating an AR object, such as a laser dot or pointer, the AR object may be moving across or around the video stream. Such movement will require not only tracking anchor points in the video stream, but also how the relationship of the AR object to the anchor points changes from frame to frame. In embodiments and as described above, the AR data can be tagged with successive keys or other identifiers that correlate to essential meta-data and/or keys tagged to each video frame, allowing the movement of an AR object imparted by a user of the receiving device to be duplicated on the transmitting device. This correlated AR data can be provided to the transmitting device's AR layer, which may coordinate rendering of the object as it moves both relative to identified anchor points, as well as based on spatial position information for movements of the camera associated with the transmitting device. In one possible embodiment, the service provider device 104 sends a video stream back to the consumer device and AR data can be received as in-band data and/or out-of-band data (to be correlated with the in-band data) depending on whether, for example, the service provider device is providing just AR data back to the consumer device 102, or providing other data such as one or more frames to be presented in the video stream for display by the consumer device 102. As previously discussed, if out-of-band data is missing, in-band data may include sufficient information to describe manipulation of one or more known objects, or refer to a library of known objects, to allow the transmitting device to render the transmitted AR data notwithstanding having missing data. The AR presentation may be updated as out-of-band data is received.

It will be appreciated that limited bandwidth, communication performance, and/or other considerations, may result in choosing a communication model where the service provider device receives (see item 408) a video stream from the client device, and returns (see item 410) AR data to the client device. In other embodiments, however, the service provider device may instead provide a modified version of the video stream transmitted 408 from the consumer device, where the AR data is transmitted as in-band data within frames of the modified video stream sent back. If the AR data cannot all be provided as in-band data, some may be transmitted out-of-band. In this embodiment, the service provider may then provide a richer AR experience by, for example, modifying the video stream to improve its quality, embed it into another video stream, mix it with another video content, such as video originating from the service provider device and/or from other parties/peers/devices to a communication session. If the AR data cannot be embedded as in-band data, it will be appreciated that some or all of the AR data may be transmitted to the consumer device as out-of-band data.

In FIG. 4B, the operations of an example method 450 are depicted, which may be carried out by a receiving device in whole or in part. The receiving device may be any machine operating as a peer or endpoint to a communication session. In some embodiments, method 450 may be carried out by service provider device 104. In operation 452, the receiving device receives the video stream with in-band essential meta-data, e.g., which includes spatial information (e.g., information about camera movement, etc.) from the transmitting device, e.g. consumer device 102, and in operation 454, the receiving device extracts the essential meta-data from the video stream. In operation 456 the receiving device correlates the received video stream (and essential meta-data) with out-of-band data, if any was provided by the transmitting device, as described above with respect to example method 200. As further described above, the essential meta-data may also include AR information, such as a point cloud and one or more anchor points, which may be part of the point cloud. In some embodiments, some of the AR information from the transmitting device is provided as out-of-band data; decisions on what to provide in-band or out-of-band may be dynamically determined based at least in part on analysis of communication session conditions, e.g., bandwidth, latency, or other communication issue between devices, e.g., consumer device 102, service provider device 104, or other devices.

In operation 458, the video stream is displayed upon a display associated with the receiving device, allowing a user of the receiving device to view the video stream provided by the transmitting device, e.g. consumer device 102. The embedded in-band essential meta-data, which includes, for example, spatial information received within the video stream, enables the user, e.g., a remote agent using the service provider device 104, to interact with the video stream for placement of AR objects as if the receiving device were capturing the video. In some embodiments, an AR layer (such as ARKit) on the receiving device can use the essential meta-data in conjunction with the video stream to recreate the point cloud and/or anchor points that would be generated on the transmitting device. In other embodiments, and as discussed above, the essential meta-data (and/or out-of-band data) includes some or all of the point cloud and/or anchor points generated by the AR layer on the transmitting device; such an approach may be beneficial when it cannot be guaranteed that the AR layer on the receiving device will determine identical or substantially identical anchor points and/or a depth point cloud as the AR layer on the transmitting device. It will be appreciated that the quality and nature of the connection between communication endpoints may dictate to what extent data may be presented in-band with the video stream, and to what extent it will need to be provided as out-of-band data. In one embodiment, the amount of in-band data will be dynamically adjusted and shifted to out-of-band data and/or replaced with object references, such as to a common library (see below) to facilitate recreating an accurate point-cloud on the receiving device.

In operation 460, the user of the receiving device can interact with the displayed video by selecting one or more AR objects to place within the scene. The AR layer of the receiving device can rely upon received essential meta-data (including a point cloud/anchor points (if transmitted), to place the AR objects similar to how they would be positioned and viewed if placed by a user of the transmitting device. As will be understood by someone skilled in the relevant art, the AR objects may be tied to one or more identified anchor points, to allow the AR objects to appear fixed in the frame, similar to other physical objects, as discussed above. Further, depending upon the specific embodiment, the user may select the AR objects from a library of possible objects or may create their own objects. The placement of AR objects may be dynamic, such as a user of the receiving device interacting with a dot or laser point, which the user may move around the scene, even as the user of the transmitting device may be moving the transmitting device.

In operation 462, information about the AR object and its placement is transmitted from the receiving device, e.g. service provider device 104, to the transmitting device, e.g. consumer device 102. As discussed above, this information may include a description of the appearance of the AR object, or may be a reference to a common library of AR objects. The placement information may include references to anchor points previously supplied by the transmitting device, or otherwise commonly shared by the transmitting and receiving devices (such as where both the transmitting and receiving device derive their own substantially identical point clouds and/or anchor points), to allow the transmitting device to accurately recreate the position of the AR object within each video frame. Further, the information about the AR object and its placement may be correlated to frames of the video stream, such as by using a key, as discussed above. Such correlating to frames may be useful where a user of the receiving device is dynamically moving one or more AR objects around the video, allowing such movements to be recreated on the display associated with the transmitting device by indicating positional changes of the one or more AR objects in each frame relative to the one or more referenced anchor points.

In one embodiment, operation 462 may include transmitting an enhanced video stream back to the transmitting device, e.g., consumer device 102. For example, the receiving device may receive multiple video streams from cameras associated with the consumer device, and/or from an environment in which the consumer device is located, and/or from other devices/other peers to a communication session. The receiving device may then enhance, modify, edit, integrate, etc. the one or more video streams it has received and provide the enhanced video stream back to the transmitting device, e.g., consumer device 102. The AR data identifying objects and other content for an AR presentation displayed (see, e.g., FIG. 4A item 414) by the transmitting device may be embedded within the returned video stream as in-band data. It will be appreciated that consideration of communication session characteristics may suggest providing some or all of the AR data as out-of-band data. In a still further embodiment, keys or tags cross-referencing the video stream frames (and its in-band data) received from the consumer device are used to coordinate sending select video frames back to the transmitting device. For example, the receiving device could transmit select enhanced video frames back to the transmitting device, and the transmitting device would substitute these modified video frames for the corresponding video frames in its video stream.

It will be appreciated by a person skilled in the relevant art that transmitting the video stream, and receiving AR object information, across a network will introduce a lag or delay, in most embodiments. Thus, a frame captured by consumer device 102 may be displayed upon a display associated with consumer device 102 prior to it being received by service provider device 104, and let alone prior to consumer device 102 receiving any AR object information. Consequently, in various embodiments, consumer device 102 and service provider device 104 may handle this lag by buffering video frames prior to display until AR information is received back from the service provider device, at which point the AR objects can be rendered and displayed to a user of the consumer device 102. Such embodiments may result in a slight delay or lag between capture of video and display of video; this lag, however, may be relatively minimal and acceptable to a user of consumer device 102, particularly where consumer device 102 and service provider device 104 are connected via a high-speed network connection. In embodiments where such a lag may be unacceptably high, consumer device 102 may display the frames as received from the video camera, and then render the AR objects in later frames from the frames where the AR objects were initially placed on the service provider device 104. Where, in embodiments, the AR object placement information is made relative to identified anchor points, rendering the object(s) in subsequent frames, even where the camera 106 has moved position, is a matter of locating the new position of the anchor point(s) in the subsequent frames and rendering the AR object(s) relative to the new position of the anchor point(s); synchronizing to specific keyed frames may be unnecessary.

Figure 5:
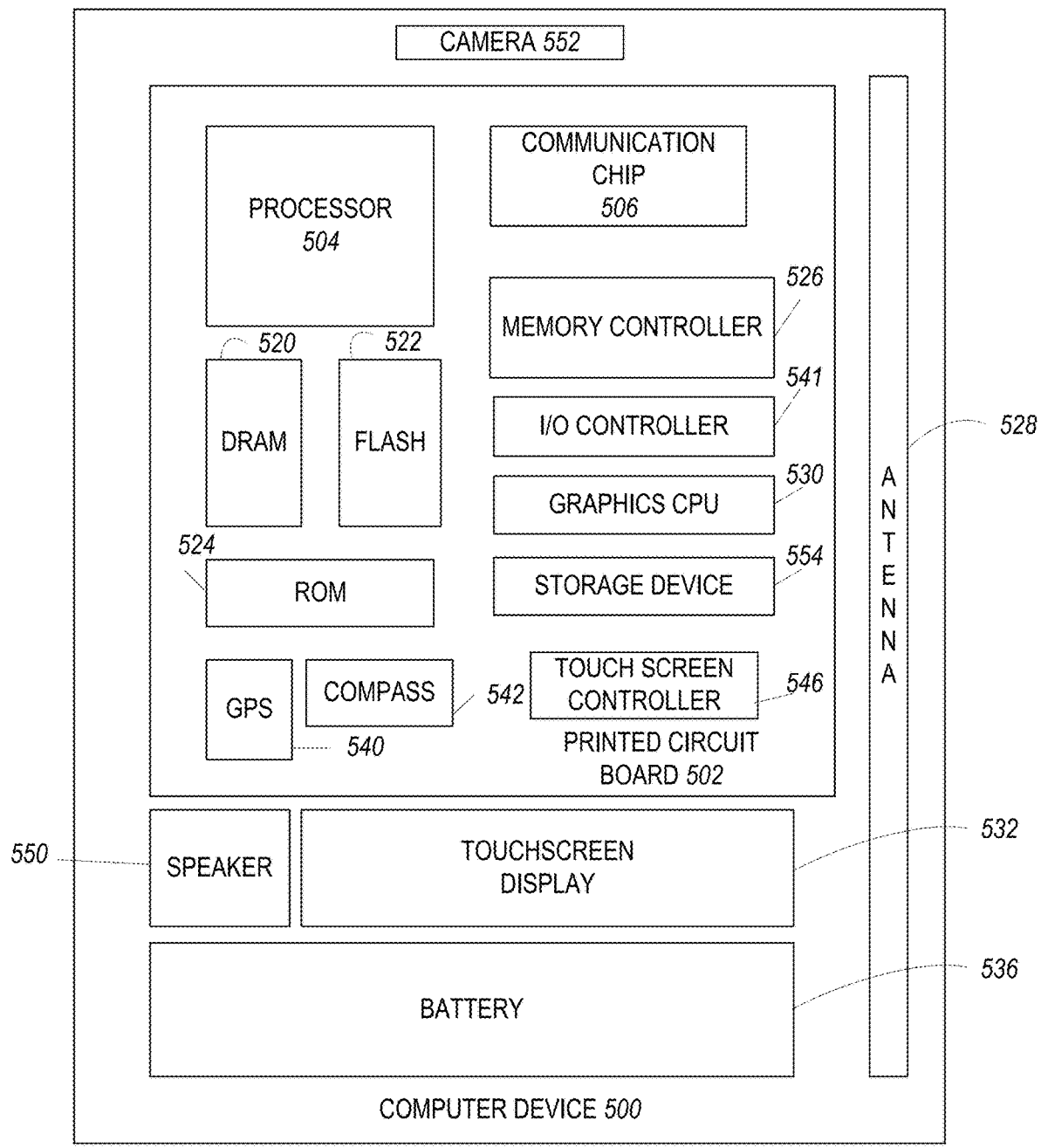
FIG. 5 is a block diagram of an example computer that can be used to implement some or all of the components of the system of FIG. 1.

FIG. 5 illustrates an example computer device 500 that may be employed by the apparatuses and/or methods described herein, in accordance with various embodiments. As shown, computer device 500 may include a number of components, such as one or more processor(s) 504 (one shown) and at least one communication chip 506. In various embodiments, the one or more processor(s) 504 each may include one or more processor cores. In various embodiments, the one or more processor(s) 504 may include hardware accelerators to complement the one or more processor cores. In various embodiments, the at least one communication chip 506 may be physically and electrically coupled to the one or more processor(s) 504. In further implementations, the communication chip 506 may be part of the one or more processor(s) 504. In various embodiments, computer device 500 may include printed circuit board (PCB) 502. For these embodiments, the one or more processor(s) 504 and communication chip 506 may be disposed thereon. In alternate embodiments, the various components may be coupled without the employment of PCB 502.

Depending on its applications, computer device 500 may include other components that may be physically and electrically coupled to the PCB 502. These other components may include, but are not limited to, memory controller 526, volatile memory (e.g., dynamic random access memory (DRAM) 520), non-volatile memory such as read only memory (ROM) 524, flash memory 522, storage device 554 (e.g., a hard-disk drive (HDD)), an I/O controller 541, a digital signal processor (not shown), a crypto processor (not shown), a graphics processor 530, one or more antennae 528, a display, a touch screen display 532, a touch screen controller 546, a battery 536, an audio codec (not shown), a video codec (not shown), a global positioning system (GPS) device 540, a compass 542, an accelerometer (not shown), a gyroscope (not shown), a speaker 550, a camera 552, and a mass storage device (such as hard disk drive, a solid state drive, compact disk (CD), digital versatile disk (DVD)) (not shown), a depth sensor (not shown), and so forth.

In some embodiments, the one or more processor(s) 504, flash memory 522, and/or storage device 554 may include associated firmware (not shown) storing programming instructions configured to enable computer device 500, in response to execution of the programming instructions by one or more processor(s) 504, to practice all or selected aspects of the system 100 and methods 200, 400 and 450, described herein. In various embodiments, these aspects may additionally or alternatively be implemented using hardware separate from the one or more processor(s) 504, flash memory 522, or storage device 554.

The communication chips 506 may enable wired and/or wireless communications for the transfer of data to and from the computer device 500. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication chip 506 may implement any of a number of wireless standards or protocols, including but not limited to IEEE 802.20, Long Term Evolution (LTE), LTE Advanced (LTE-A), General Packet Radio Service (GPRS), Evolution Data Optimized (Ev-DO), Evolved High Speed Packet Access (HSPA+), Evolved High Speed Downlink Packet Access (HSDPA+), Evolved High Speed Uplink Packet Access (HSUPA+), Global System for Mobile Communications (GSM), Enhanced Data rates for GSM Evolution (EDGE), Code Division Multiple Access (CDMA), Time Division Multiple Access (TDMA), Digital Enhanced Cordless Telecommunications (DECT), Worldwide Interoperability for Microwave Access (WiMAX), Bluetooth, derivatives thereof, as well as any other wireless protocols that are designated as 3G, 4G, 5G, and beyond. The computer device 500 may include a plurality of communication chips 506. For instance, a first communication chip 506 may be dedicated to shorter range wireless communications such as Wi-Fi and Bluetooth, and a second communication chip 506 may be dedicated to longer range wireless communications such as GPS, EDGE, GPRS, CDMA, WiMAX, LTE, Ev-DO, and others.

In various implementations, the computer device 500 may be a laptop, a netbook, a notebook, an ultrabook, a smartphone, a computer tablet, a personal digital assistant (PDA), a desktop computer, smart glasses, or a server. In further implementations, the computer device 500 may be any other electronic device that processes data.

Figure 6:
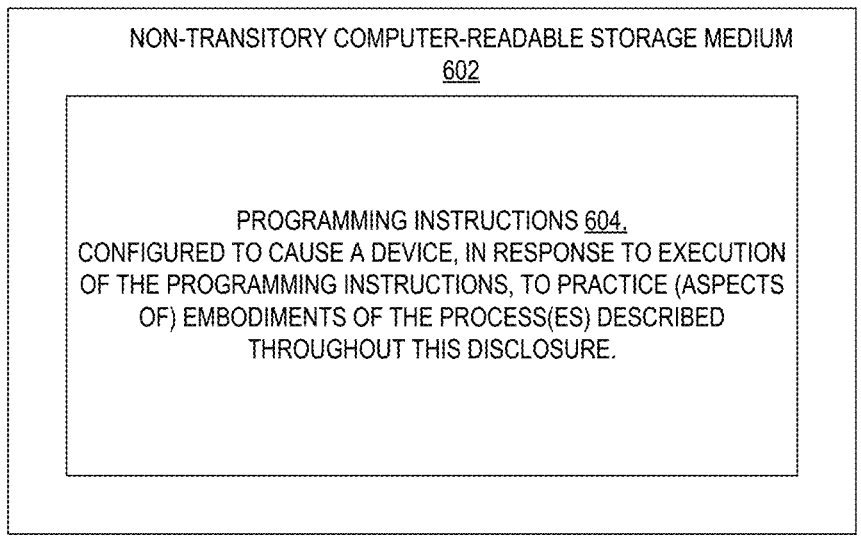
FIG. 6 is a block diagram of a computer-readable storage medium that can be used to implement some of the components of the system or methods disclosed herein, according to various embodiments.

As will be appreciated by one skilled in the art, the present disclosure may be embodied as methods or computer program products. Accordingly, the present disclosure, in addition to being embodied in hardware as earlier described, may take the form of an entirely software embodiment (including firmware, resident software, micro-code, etc.) or an embodiment combining software and hardware aspects that may all generally be referred to as a "circuit," "module" or "system." Furthermore, the present disclosure may take the form of a computer program product embodied in any tangible or non-transitory medium of expression having computer-usable program code embodied in the medium. FIG. 6 illustrates an example computer-readable non-transitory storage medium that may be suitable for use to store instructions that cause an apparatus, in response to execution of the instructions by the apparatus, to practice selected aspects of the present disclosure. As shown, non-transitory computer-readable storage medium 602 may include a number of programming instructions 604. Programming instructions 604 may be configured to enable a device, e.g., computer 500, in response to execution of the programming instructions, to implement (aspects of) system 100, method 200, 400 and/or method 450. In alternate embodiments, programming instructions 604 may be disposed on multiple computer-readable non-transitory storage media 602 instead. In still other embodiments, programming instructions 604 may be disposed on computer-readable transitory storage media 602, such as, signals.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Although certain embodiments have been illustrated and described herein, it will be appreciated by those of ordinary skill in the art that a wide variety of alternate and/or equivalent embodiments or implementations calculated to achieve the same purposes may be substituted for the embodiments shown and described without departing from the scope. Those with skill in the art will readily appreciate that embodiments may be implemented in a very wide variety of ways.

This application is intended to cover any adaptations or variations of the embodiments discussed herein. Therefore, it is manifestly intended that embodiments be limited only by the claims and the equivalents thereof.

What is claimed is:

1. A method for a service provider to synchronize augmented reality (AR) objects across a network with a device, in which essential meta-data and nonessential data facilitate first and second rendering of an AR presentation, comprising:
receiving, over the network from the device, a video stream associated with the device, the video stream including embedded in-band therein the essential meta-data corresponding to at least motion of the device while capturing the video stream to facilitate the first rendering, and an associated separate non-embedded out-of-band nonessential data to facilitate the second rendering, wherein the device determines selection of information that is embedded in-band and information that is non-embedded out-of-band nonessential data dynamically based at least in part on analysis of communication session conditions, the essential meta-data embedded in the video stream such that the essential meta-data is non-visible;
extracting the essential meta-data information from the video stream;
determining, based at least in part on the essential meta-data, initial AR information including placement of one or more AR objects in the video stream;
determining the first rendering based at least in part on the initial AR information;
determining an updated AR information based at least in part on updating the initial AR information based at least in part on the separate nonessential data; and
determining the second rendering based at least in part on refining the initial rendering based at least in part on the updated AR information.

2. The method of claim 1, further comprising:
receiving, over the network, the separate nonessential data corresponding to the video stream over the network contemporaneously with the video stream;
determining an updated placement of the one or more AR objects in the video stream based at least in part on the updated AR information.

3. The method of claim 2, further comprising:
providing the updated AR information over the network.

4. The method of claim 2, further comprising:
receiving the video stream with a transport having at least a first and a second synchronized data stream, wherein the first data stream includes the video stream and the second data stream includes the nonessential data.

5. The method of claim 1, wherein extracting the essential meta-data comprises:
receiving essential meta-data represented as non-visible data within the video stream; and
deobfuscating the essential meta-data within the video stream to facilitate the extracting.

6. The method of claim 1, further comprising:
determining, for a selected one or more frame of the video stream, a corresponding essential meta-data for the selected one or more frame; and
calculating at least the initial AR information for the one or more frame based at least in part on the corresponding essential meta-data.

7. A non-transitory computer readable medium (CRM) comprising instructions for a service provider to synchronize augmented reality (AR) objects across a network with a device, in which essential meta-data and nonessential data facilitate first and second rendering of an AR presentation, the instructions executable by an apparatus, that when executed cause the apparatus to:
receive a video stream from the device, the video stream including embedded in-band therein the essential meta-data corresponding to at least motion of the device while capturing the video stream to facilitate the first rendering, and an associated separate non-embedded out-of-band nonessential data to facilitate the second rendering, wherein the device determines selection of information that is embedded in-band and information that is non-embedded out-of-band nonessential data is determined dynamically based at least in part on analysis of communication session conditions, the essential meta-data embedded in the video stream such that the essential meta-data is non-visible;
extract the essential meta-data information from the video stream;
determine, based at least in part on the essential meta-data, initial AR information including placement of one or more AR objects in the video stream;
provide the initial AR information to the device;
determining the first rendering based at least in part on the initial AR information;
determine an updated AR information based at least in part on updating the initial AR information based at least in part on the separate nonessential data; and
determining the second rendering based at least in part on refining the initial rendering based at least in part on the updated AR information.

8. The CRM of claim 7, wherein the instructions are to further cause the apparatus to:
receive the separate nonessential data corresponding to the video stream over the network contemporaneously with the video stream; and
determine an updated placement of the one or more AR objects in the video stream based at least in part on the updated AR information.

* * * * *